June 21, 1938.　　M. B. ANDERSON ET AL　　2,121,066
FLEXIBLE COUPLING
Filed April 10, 1937
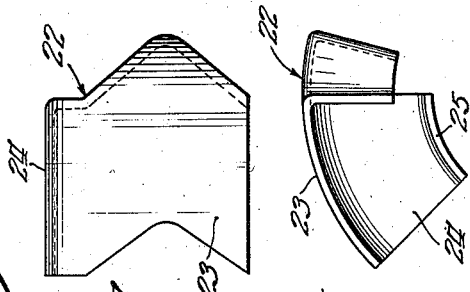
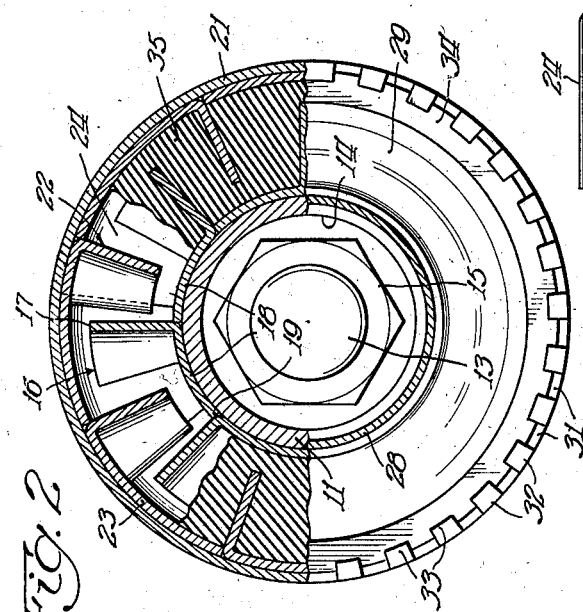
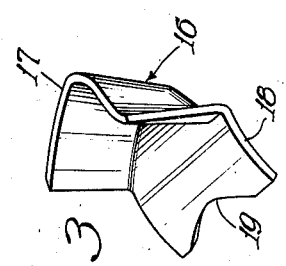
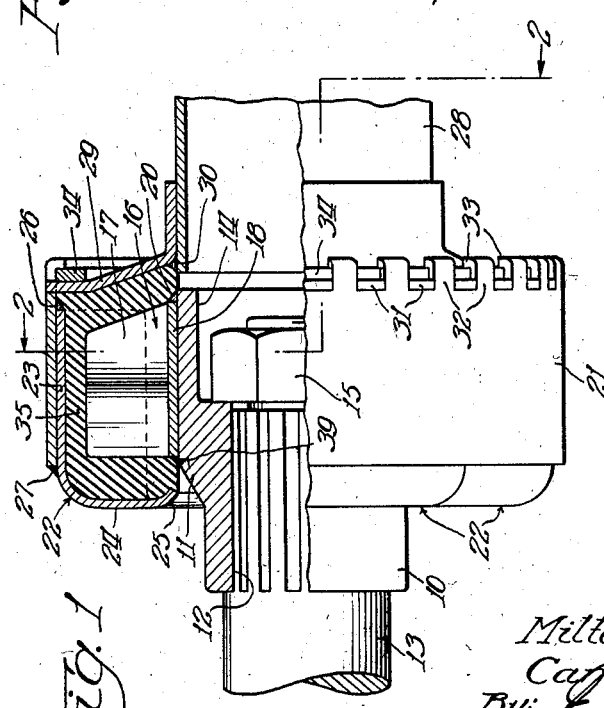
Inventors:
Milton B. Anderson and
Carl E. Swenson.
By: Edward C. Fitzbough Atty.

Patented June 21, 1938

2,121,066

UNITED STATES PATENT OFFICE 2,121,066

FLEXIBLE COUPLING

Milton B. Anderson and Carl E. Swenson, Rockford, Ill., assignors to Borg-Warner Corporation, Chicago, Ill., a corporation of Illinois Application April 10, 1937, Serial No. 136,166

11 Claims. (Cl. 64—9)

This invention relates to flexible couplings for power shafts and particularly to that type of coupling which employs a resilient medium as a torque transmitting means.

It has been known for some time that a driven shaft, when driven from a driving shaft through the medium of a resilient substance such as rubber, rotates at substantially constant velocity despite angular and parallel axial misalignment, and despite the presence of irregular vibrations in the driving member. A coupling, to be satisfactory for driving purposes, must have reasonable flexibility as well as ample torque capacity, and it must also be able to resist heavy thrust loads such as result from the friction caused by a spline slip joint of an automobile propeller shaft.

It is the object of this invention to provide a flexible coupling of an improved and simple type in which the driven member is rotated at substantially constant velocity despite the presence of vibrations, audible or inaudible in the driving member.

A feature of the invention is a novel form of rubber contacting member or blade which is made V-shaped to resist heavy thrust loads.

Another feature is a contacting member or blade which includes a tab by which it is spaced from succeeding blades.

Another feature is a novel form of driven member blade which, in addition to a spacing tab, is also provided with a radial portion which forms a retaining wall for the rubber.

Still another feature is a novel construction for the driven blade support which is exceedingly simple and inexpensive.

Still another feature is a simple, yet effective, connecting means between the support for the driven member blades and the driven member itself.

Still another feature is a construction of driving and driven member blades of the support for the latter and of the connecting means between the latter and driven member by which these parts are made of stampings.

These and other features and objects will become apparent from the following detailed description thereof when taken in connection with the accompanying drawing which forms a part thereof, and in which:

Fig. 1 is a side elevation partly in section of the assembled coupling;

Fig. 2 is a front elevation of the coupling with a part of the resilient substance removed;

Fig. 3 is a perspective of a driving member blade;

Fig. 4 is a plan view of a blade for the driven member; and

Fig. 5 is the corresponding front elevation of the blade of Fig. 4.

Referring now to the drawing for a detailed description of the invention, 10 is a hub which is provided with a portion of enlarged diameter 11 and with internal splines 12 for attachment to a driving shaft 13. Other means for attaching hub 10 to the driving shaft may be used, however, without materially affecting the operation of this invention.

Enlarged portion 11 is hollowed out at 14 to receive a nut 15 which is used to secure hub 10 against axial movement on shaft 13. Around the periphery of enlarged portion 11 is located a plurality of radial V-shaped blades 16. These blades are shown in detail in Fig. 3 and comprise a single stamping having a V-shaped portion 17, which is the driving portion of the blade, and a substantially circular portion or tab 18 which serves a double purpose; it is used, first, as a means by which the blade is secured to enlarged portion 11 of hub 10 and, second, it is of sufficient length so that its rear edge 19 serves to space the following blade with respect to blade 16. The number and size of the blades depend, of course, upon the total load to be carried by the coupling and can be varied to meet particular requirements.

Tabs 18 may be secured to enlarged portion 11 in any suitable manner, but we prefer to weld them thereto as shown at 20 and 39 in Fig. 1. It may be observed from Fig. 6 that rear edge 19 of tab 18 is cut in the form of a V, the angle of which is the same as the angle between the sides of the V-shaped portion 17. In addition to spacing blades 17 circumferentially, therefore, tab 18 also insures perfect alignment between the blades so that corresponding portions thereof are equidistantly spaced as well as the center or apex.

Surrounding blades 17 is a cylindrical shell 21 which is slightly longer than enlarged portion 11 of hub 10. Projecting radially inward from shell 21 into the interstices between blades 16 is a plurality of blades 22 equal in number to the blades on the driving member and equidistantly spaced therefrom. Referring now to Figs. 4 and 5 wherein a typical blade 22 is shown in detail, it will be observed that the driven member blade 22 is likewise formed from a single stamping. The driving portion 22 is also V-shaped and is provided with a tab 23 which serves to space and align succeeding blades with blade 22. One side 24, however, is made in the form of a sector of a ring and with an inturned edge 25. Sectors 24, when placed side by side, form a complete retaining wall for a resilient driving substance, to be hereinafter described. Blades 22 may likewise be secured to cylindrical shell 21 in a number of ways, but we prefer to weld them thereto as shown at 26 and 27.

The driven member of the coupling may comprise a propeller shaft or torque tube 28 which is provided with a flange 29. To simplify the construction of the driven member, flange 29 may may be made as a separate stamped unit which is subsequently secured by welding as at 30, or otherwise, to torque tube 28. Flange 29 is provided with a number of teeth 31 extending radially outward from its periphery and preferably of square form. Cylindrical shell 21 is slotted at its driven member end to form a number of axial teeth or tabs 32 which fit between teeth 31 of flange 29. The ends of axial teeth 32 are turned inward as at 33 and an oversized split ring 34 is sprung into the space between inturned ends 33 and teeth 31 to form a lock therebetween.

The space between driving member teeth 17 and driven member teeth 22 is filled with a resilient substance such as rubber or the like which may be vulcanized directly to the blades and flange 29. It is apparent from Figs. 1 and 2 that the driving and driven members of the coupling are at no point in direct contact with one another, and that the driving action therebetween is derived solely from the compression of the rubber between blades 16 and 22. The driven member, therefore, is not constrained to move in a particular path with respect to the driving member and hence its torque reaction is used to lessen, and in some cases, completely to eliminate undesirable velocity variations whether audible or inaudible and whether periodic or non-periodic.

It has been found that by shaping the blades in the form of a V, less tendency is exihibited by the rubber to flow axially from between adjacent blades and to exert a spreading force between flange 29 and the opposite wall-forming section 24 of blades 22. The V-shape likewise increases the resistance of the joint to axial thrusts by causing the rubber to take such loads in compression rather than in shear as would be the case if flat blades were used.

It is understood that in the foregoing description blades 22, if desired, can be made the driving blades and blades 17 the driven blades. It is understood further that the foregoing description is merely illustrative of a preferred embodiment of the invention, and that the scope of the invention, therefore, is not to be limited thereto but is to be determined by the appended claims.

We claim:

1. In a flexible coupling a driving member, a driven member, V-shaped blades rigidly secured to one of said members, V-shaped blades secured to the other of said members and extending into the interstices between the first-mentioned V-shaped blades, the apices of the blades on both members being faced in the same direction and in substantial alignment with one another, and a resilient medium substantially surrounding the blades and forming an operative vibration-absorbing driving connection therebetween.

2. In a flexible coupling a driving member, a driven member, one of said members being apertured to receive the other member, spaced V-shaped blades on the inner member extended radially outward, spaced V-shaped blades on the apertured member extending radially inward, the apices of all of said blades being faced in the same direction and in substantial alignment with one another, and a resilient medium substantially surrounding the blades and forming an operative vibration-absorbing driving connection therebetween.

3. In a flexible coupling a driving member, a driven member, radial blades on said driving and driven members in interlocked relation, each blade having a tab at the base thereof for attachment to the driving and driven members, said tabs being of such length as to constitute a spacing means for the blades, and a resilient medium substantially surrounding the blades and forming an operative vibration-absorbing driving connection therebetween.

4. In a flexible coupling a driving member, a driven member, radial V-shaped blades on said members in interlocked relation, the apices of the blades being faced the same direction and in alignment with one another, tabs at the bases of the blades for attachment to the driving and driven members, said tabs being of sufficient length to constitute a spacing means for the blades, and a resilient medium substantially surrounding the blades and forming an operative vibration-absorbing driving connection therebetween.

5. In a flexible coupling, a driving member, a driven member, a set of radial V-shaped blades on the driving member, a set of radial V-shaped blades on the driven member in interlocked relation with the first-mentioned set, tabs at the bases of the blades for attachment to the driving and driven members, said tabs being of sufficient length to constitute spacing means for the blades, a resilient medium substantially surrounding the blades and forming an operative vibration-absorbing driving connection therebetween, and extensions on one set of blades for restricting the egress of the resilient medium from between adjacent blades.

6. In a flexible coupling, a driving member, a driven member, having an enlarged opening to receive the driving member, a set of V-shaped blades extending radially outward from the driving member, a set of V-shaped blades extending radially inward from the opening from the driven member and in interlocked relation with the blades on the driving member, tabs at the bases of the blades for attachment to the driving and driven members, a resilient medium substantially surrounding the blades and forming an operative vibration-absorbing driving connection therebetween, and extensions on the blades on the driven member forming a substantially continuous annulus for restricting the egress of the resilient medium from between adjacent blades.

7. In a flexible coupling, driving and driven members, blades on the driving and driven members in interlocked relation, and a resilient medium substantially surrounding said blades and forming an operative driving connection therebetween, one of said members comprising a flange having a toothed edge, a cylindrical shell having a toothed end, the teeth on the shell having inturned ends and being of such size as to interlock with the teeth on the flange to form a driving connection therebetween, and a locking ring between the inturned ends of the teeth on the shell and the flange.

8. In a flexible coupling, driving and driven members, a set of blades on the driving member a set of blades on the driven member, said sets being arranged in interlocked relation, and a resilient medium substantially surrounding the blades and forming an operative driving connection therebetween, one of said members comprising a flange and a cylindrical shell secured to said flange, the set of blades on the flanged member having an inturned portion which forms a substantially continuous annulus for restricting the egress of the resilient medium from between the blades.

9. In a flexible coupling, a driving member having a cylindrical surface, a driven member comprising a toothed flange, a cylindrical shell having a toothed end, the teeth in the shell having inturned ends and being of such size as to interlock with the teeth on the flange to form a driving connection therewith, and a locking ring between inturned ends of the teeth on the shell and the flange; radial V-shaped blades on the driving member, radial V-shaped blades on the shell extending inwardly therefrom and in interlocked relation with the blades on the driving member, tabs at the bases of all of said blades for securing said blades to the cylindrical surface of the driving member and to the inside of the shell and for spacing said blades with respect to one another, rubber substantially filling the shell and forming a driving connection between the blades, and an inturned portion on the blades on the shell to form a substantially continuous annulus for restricting the egress of the rubber from between the blades.

10. As a new article of manufacture, a blade for a flexible coupling having a V-shaped driving surface and an extension for spacing the blade from adjacent blades.

11. As a new article of manufacture, a blade for a flexible coupling having a V-shaped driving surface, an extension for spacing the blade from an adjacent blade, and a portion substantially at right angles to the spacing extension to form a closure for the coupling.

MILTON B. ANDERSON.
CARL E. SWENSON.